United States Patent
Glatt et al.

(12)

(10) Patent No.: US 6,783,913 B2
(45) Date of Patent: Aug. 31, 2004

(54) POLYMERIC ACETAL RESINS CONTAINING FREE RADICAL INHIBITORS AND THEIR USE IN LITHOGRAPHIC PRINTING

(75) Inventors: Hans-Horst Glatt, Munich (DE); Udo Dwars, Herzberg (DE); Harald Baumann, Osterode am Harz (DE); Ingrid Glatt, Munich (DE)

(73) Assignee: Kodak Polychrome Graphics LLC, Norwalk, CT (US)

( * ) Notice: Subject to any disclaimer, the term of this patent is extended or adjusted under 35 U.S.C. 154(b) by 0 days.

(21) Appl. No.: 10/117,505

(22) Filed: Apr. 5, 2002

(65) Prior Publication Data

US 2003/0198887 A1 Oct. 23, 2003

(51) Int. Cl.[7] .............................................. G03F 7/0021
(52) U.S. Cl. .................... 430/175; 430/176; 430/270.1; 430/326; 525/56; 525/61
(58) Field of Search ................................ 430/175, 176, 430/270.1, 157; 525/56, 61

(56) References Cited

U.S. PATENT DOCUMENTS

| | | |
|---|---|---|
| 3,208,977 A | 9/1965 | Schoenthaler et al. |
| 3,512,971 A | 5/1970 | Floss et al. .................. 96/35.1 |
| 3,647,464 A | 3/1972 | Smith et al. |
| 4,631,245 A | 12/1986 | Pawlowski .................. 430/175 |
| 4,687,727 A | 8/1987 | Toyama et al. ............. 430/175 |
| 5,045,429 A | 9/1991 | Mack et al. ................. 430/175 |
| 5,112,906 A | 5/1992 | Ogata et al. |
| 5,219,699 A | * 6/1993 | Walls et al. ................. 430/156 |
| 5,275,907 A | 1/1994 | Walls .......................... 430/157 |
| 5,534,381 A | * 7/1996 | Ali et al. ..................... 430/156 |
| 5,599,650 A | 2/1997 | Bi et al. .................. 430/273.1 |
| 5,773,194 A | 6/1998 | Hattori et al. ........... 430/284.1 |
| 5,985,996 A | 11/1999 | Baumann et al. ............. 525/59 |
| 6,051,366 A | 4/2000 | Baumann et al. ........ 430/281.1 |
| 6,087,066 A | 7/2000 | Baumann et al. |

FOREIGN PATENT DOCUMENTS

| | | |
|---|---|---|
| DE | 19847616 A1 | 4/2000 |
| EP | 0368832 A2 | 5/1990 |
| EP | 0 752 430 B1 | 9/2000 |
| EP | 1046958 A1 | 10/2000 |
| FR | 2090532 | 1/1972 |
| GB | 2307686 | 6/1997 |
| WO | WO 01/09682 A2 | 2/2001 |

* cited by examiner

Primary Examiner—John S. Chu
(74) Attorney, Agent, or Firm—RatnerPrestia

(57) ABSTRACT

Polymeric acetal resins useful in lithographic printing are disclosed. The polymeric acetal resin contains units (A), (B), (C), (D), and (E). Unit (A) is a vinyl alcohol unit. Unit; (B) is a polyvinyl acetal unit containing an R group, where R is hydrogen, an aliphatic group, an aromatic group, or an arylaliphatic group. Unit (C) is a vinyl carboxylate unit. Unit (D) is an acidic vinyl acetal unit and/or a residue of an acidic vinyl monomer. Unit (E) is a free radical polymerization-inhibiting vinyl acetal unit and/or a free radical polymerization-inhibiting vinyl alcohol ester unit. The resin comprises about 10 to about 60 mol % of unit (A), about 5 to about 60 mol % of unit (B), about 0.3 to about 30 mol % of unit (C), about 1 to about 40 mol % of unit (D), and about 0.01 to about 2 mol % of unit (E).

41 Claims, No Drawings

POLYMERIC ACETAL RESINS CONTAINING FREE RADICAL INHIBITORS AND THEIR USE IN LITHOGRAPHIC PRINTING

FIELD OF THE INVENTION

This invention relates to lithographic printing. More particularly, this invention relates to imageable elements useful as lithographic printing plate precursors.

BACKGROUND OF THE INVENTION

In lithographic printing, ink receptive regions, known as image areas, are generated on a hydrophilic surface. When the surface is moistened with water and ink is applied, the hydrophilic regions retain the water and repel the ink, and the ink receptive regions accept the ink and repel the water. The ink is transferred to the surface of a material upon which the image is to be reproduced. Typically, the ink is first transferred to an intermediate blanket, which in turn transfers the ink to the surface of the material upon which the image is to be reproduced.

A class of imageable elements useful as lithographic printing plates, also called printing plate precursors, comprises a photosensitive layer over the surface of a hydrophilic substrate. The photosensitive layer comprises one or more radiation-sensitive components, which may be dispersed in a suitable binder. Alternatively, the radiation-sensitive component can also be the binder material.

If after exposure to radiation, the exposed regions of the photosensitive layer are removed in the developing process, revealing the underlying hydrophilic surface of the substrate, the element is positive working. Conversely, if the unexposed regions are removed by the developing process, the element is negative working. In each instance, the regions of the radiation-sensitive layer (i.e., the image areas) that remain are ink-receptive and the regions of the hydrophilic surface revealed by the developing process accept water, typically a fountain solution, and repel ink.

Of particular value in lithographic photosensitive compositions are binders based on a polymeric acetal backbone. Photosensitive compositions which contain polyvinyl acetals, for example, polyvinyl formal or polyvinyl butyral, as binders and diazonium salt polycondensation products as photosensitive compounds are disclosed in Baumann, U.S. Pat. No. 5,700,619, incorporated herein by reference; Pawlowski, U.S. Pat. No. 4,631,245; and WO 9303068. Although these binders produce lithographic printing plates having high print run performance, the photosensitive compositions and the lithographic printing plate precursors derived therefrom, have limited shelf life. Thus, a need exists for lithographic printing plate precursors that have a high print run performance and good shelf life.

SUMMARY OF THE INVENTION

In one aspect, the invention is a polymeric acetal resin comprising units (A), (B), (C), (D), and (E), in which:

unit (A) has the structure:

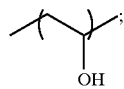

unit (B) has the structure:

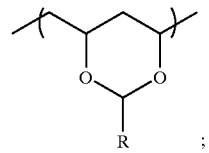

unit (C) has the structure:

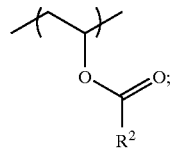

unit (D) is selected from the group consisting of ($D^1$), ($D^2$), and combinations thereof,
in which unit ($D^1$) has the structure:

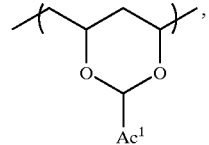

and unit ($D^2$) has the structure

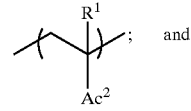

unit (E) is selected from the group consisting of ($E^1$), ($E^2$), and combinations thereof in which
unit ($E^1$) has the structure:

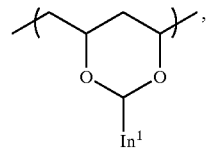

and unit ($E^2$) has the structure

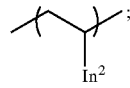

in which the polymeric acetal resin comprises about 10 to about 60 mol % of unit (A), about 5 to about 60 mol % of unit (B), about 0.3 to about 30 mol % of unit (C), about 1 to about 40 mol % of unit (D), and about 0.01 to about 2 mol % of unit (E);

in which:
R and $R^2$ are each independently hydrogen, an aliphatic group, an aromatic group, or an arylaliphatic group;
$Ac^1$ and $Ac^2$ are each independently a group comprising a carboxylic acid group, a sulfonic acid group, a sulfonamido group, a phosphonic acid group, a proton-bearing phosphoric ester group, a phenolic group, or an alkali metal salt or an ammonium salt thereof;

$R^1$ is H, $C_1$–$C_{10}$ alkyl, or carboxyl-substituted $C_1$–$C_{10}$ alkyl; and $In^1$ and $In^2$ are each independently a group that inhibits free radical polymerization.

In another aspect, the invention is a photosensitive composition comprising a polymeric diazo resin and the polymeric acetal resin.

In another aspect, the invention is a lithographic printing plate precursor comprising a layer of the photosensitive composition over a hydrophilic surface of a substrate having the hydrophilic surface.

In a further aspect, the invention is a method for preparing a lithographic printing plate comprising imagewise exposing and developing the lithographic printing plate precursor to remove the unexposed regions. In yet a further aspect, the invention is a printing plate produced by this method.

Incorporation of the radical inhibiting groups $In^1$ and $In^2$ into the polymeric acetal resins produces significant and useful improvements in the shelf life of the photosensitive compositions and imageable elements, even though unbound inhibitors in equivalent amount produce no noticeable improvement in shelf life.

DETAILED DESCRIPTION OF THE INVENTION

Photosensitive Composition

The photosensitive composition comprises a polymeric acetal resin and a polymeric diazo resin. Other ingredients that are conventional components of photosensitive compositions may also be present.

Polymeric Acetal Resin

The photosensitive composition comprises a binder based on either polyvinyl alcohol or on a copolymer comprising units of (1) vinyl alcohol and (2) acrylic acid and/or a substituted acrylic acid. Although acrylic acids substituted with a $C_1$–$C_{10}$ alkyl group that is optionally carboxyl-substituted can be used, preferred acids are acrylic acid, methacrylic acid, and crotonic acid. The hydroxyl groups of the polymer or copolymer are acetalized or esterified with the appropriate groups to form the polymeric acetal resin.

Preferred polyvinyl alcohols or copolymers for the synthesis have a residual content of esterified groups in the range of about 0.3 to about 30 mol %. More preferred are polyvinyl alcohols prepared starting from polyvinyl acetate, i.e. $R^2$=—$CH_3$ with a residual acetate content of about 1.5 to about 22 mol %. The behavior in alkaline developers and the photosensitivity of photosensitive compositions employing the polymeric resin as binder can be influenced by the molecular weight of the polyvinyl alcohols used in the synthesis. Preferred polyvinyl alcohols exhibit viscosities of between about 2 and about 26 mPa·s as 4% aqueous solution in water at 20° C.

The acetalization of the polyvinyl alcohols may be carried out by conventional techniques, such as are described; for example, in EP-B-216 083 and DE-A-28 38 025. The acetal moieties can be introduced starting with aldehydes or acetals of these aldehydes with a lower alcohol, i.e., an alcohol comprising up to about six carbon atoms such as methanol, ethanol, n-propanol, n-butanol, n-pentanol, n-hexanol, iso-propyl alcohol, iso-butyl alcohol, tert-butyl alcohol, iso-pentyl alcohol, and cyclohexanol. This reaction generally requires the addition of a strong inorganic or organic catalyst acid, such as hydrochloric acid, sulfuric acid, phosphoric acid and p-toluene sulfonic acid. A particularly preferred catalyst acid is hydrochloric acid. The amount of acid added should preferably be about 1 to about 25 wt % based on the amount of polyvinyl alcohol used. The reaction temperature of the acetalization depends on the aldehyde as well as the desired extent of reaction. It is typically between about 0° C. and, if applicable, about the boiling point of the solvent used. Preferably the temperatures are between about 5° C. and about 100° C.

Organic solvents as well as mixtures of water with organic solvents are used as acetalization agents. Particularly suitable organic solvents are alcohols (such as methanol, ethanol, propanol, butanol and glycol ether), cyclic ethers (such as tetrahydrofuran, 1,4-dioxane, and 1,3-dioxolane) and dipolar aprotic solvents (such as dimethyl sulfoxide, formamide, N,N-dimethyl formamide, hexamethyl phosphoric acid triamide and N-methylpyrrolidone). If the acetalization is carried out in organic solvents or mixtures of organic solvents with water, the reaction product often remains in solution even if the starting polyvinyl alcohol was not completely dissolved. This offers the advantage that the degree of reaction is relatively easy to reproduce. The sequence of the addition of the various acetalization agents is often of no importance and comparable finished products are obtained from different preparation sequences. To isolate the finished product as a solid, the polymer solution is introduced into a non-solvent under stirring, filtered off and dried. Water is especially suitable as non-solvent for the polymer. Another, also practicable, method is to add the non-solvent for the polymer under stirring to the synthesis solution. In this method too, water is a preferred non-solvent. To obtain the desired properties for the polymeric acetyl resin, it may be advantageous to isolate the polymer between individual acetalization steps by precipitation, and to continue the acetalization upon dissolution in an optionally different solvent than that of the previous acetalization step. Unit (A) comprises about 10 to about 60 mol %, preferably about 20 to about 50 mol % of the polymeric acetal resin.

In unit (B), moiety R is hydrogen or branched or straight-chain alkyl groups having preferably 1 to 18 carbons, more preferably 1 to 6 carbons, more preferably 1 to 3 carbon atoms. Particularly preferred is the incorporation of R starting from acetaldehyde, propionaldehyde or butyraldehyde, their corresponding acetals with lower alcohols, or both. Unit (B) comprises about 5 to about 60 mol %, preferably about 20 to about 50 mol %, of the polymeric acetyl resin.

Unit (C) comprises about 0.3 to about 30 mol %, preferably about 0.5 to about 20 mol %, of the polymeric acetyl resin. $R^2$ is typically the methyl group present in the polyvinyl alcohol polymer or copolymer from which the polymeric acetyl resin is prepared. However, it can be hydrogen or an aliphatic, aromatic, or arylaliphatic group introduced via esterification of the hydroxyl groups on the binder with the corresponding carboxylic acids, under commonly known reaction conditions.

Unit (D) can be any combination of $D^1$ or $D^2$ functionality. Unit (D) comprises about 1 to about 40 mol %, preferably about 2 to about 20 mol %, and most preferably about 2 to about 10 mol % of the polymeric acetyl resin.

Group $Ac^1$ can be readily introduced under the above acetalization conditions starting from aldehydes HOOC—Y—CO—NR"—X—CHO or acetals of these aldehydes HOOC—Y—CO—NR"—X—CH(OR$^{14}$)$_2$. Substituent R"

may comprise a hydrogen atom, a branched or straight-chain alkyl, an aryl or arylalkyl group. Preferably R" is hydrogen and alkyl, more preferably hydrogen or a methyl group. The spacer group X is a divalent alkyl, aryl, or arylalkyl group comprising from 1 to 20 carbon atoms. Preferably used spacer groups are —$CH_2$—, —$CH(CH_3)$— or —$CH_2$—$CH_2$—$CH_2$—. $R^{14}$ is a lower alkyl group comprising 1 to 6 carbon atoms, such as methyl, ethyl, propyl, butyl, pentyl, or hexyl.

The spacer group Y is typically a divalent saturated or unsaturated, substituted or unsubstituted open chain group, preferably comprising a chain of 2 to 4 carbon atoms; or a divalent substituted or unsubstituted monocyclic or bicyclic group, preferably comprising 5 to 10 atoms other than hydrogen in the monocyclic or bicyclic group, of which up to two may be heteroatoms, preferably heteroatoms selected from the group consisting of oxygen, nitrogen, and sulfur, and the remainder are carbon atoms. Y is preferably —$CR^3R^4$—$CR^5R^6$—, —$CR^3$=$CR^4$—,

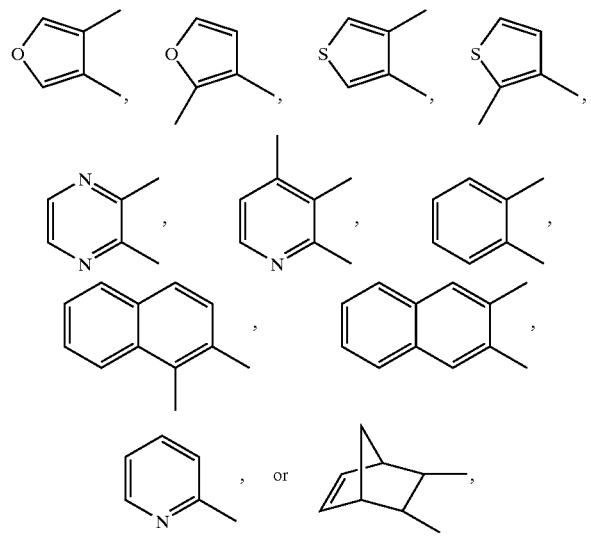

in which $R^3$, $R^4$, $R^5$, $R^6$ each are independently selected from the group consisting of hydrogen and alkyl groups having 1 to 3 carbon atoms.

The preparation of the aldehydes or acetals necessary for the polymer synthesis is also easily possible starting from the corresponding amine NHR"—X—$CH(OR^{14})_2$ by reaction with an intramolecular, cyclic carboxylic acid anhydride of formula (I).

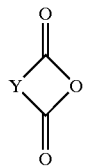

(I)

The reaction takes place quantitatively at room temperature in aprotic solvents. Preferred solvents are benzene, toluene, xylene, tetrahydrofuran, 1,4-dioxane, 1,3-dioxolane and the like. When an appropriate solvent is chosen, it can be achieved that the final product is insoluble in the solvent and precipitates. Appropriate solvents for this are non-polar solvents such as hexane, cyclohexane and the like. Another variant is to use HOOC—Y—CO—NR"—X—$CH(OR^{14})_2$ in a solvent suitable for the reaction to form the polymer and to thus avoid having to isolate it as a free substance. Particularly suitable solvents for this are cyclic ethers (such as tetrahydrofuran, 1,4-dioxane, 1,3-dioxolane) or dipolar aprotic solvents (such as dimethyl sulfoxide, formamide, N,N-dimethyl formamide, hexamethyl phosphoric acid triamide or N-methylpyrrolidone). Under certain conditions it may be advantageous to use the free aldehyde HOOC—Y—CO—NR"—X—CHO when introducing the carboxyl group bearing acetal group. It is easily accessible by means of a mild hydrolysis from the above-described acetal.

Suitable intramolecular, cyclic carboxylic acid anhydrides of formula (I), include, for example, maleic anhydride and derivatives thereof (such as dimethyl maleic anhydride and citraconic anhydride); itaconic anhydride; phthalic acid anhydride and its substitution products (such as chloro-, nitro- and carboxyphthalic acid anhydride) and hydrogenation products (such as tetrahydrophthalic acid anhydride); succinic anhydride and derivatives thereof (such as methyl succinic anhydride); glutaric anhydride and derivatives thereof (such as 3-oxaglutaric anhydride, 3-methylglutaric anhydride, 3,3-tetramethylene glutaric anhydride and camphoric anhydride); naphthalene-2,3-dicarboxylic acid anhydride and its ring-substituted products; naphthalene-1,8-dicarboxylic acid and its ring-substituted products; pyridine-2,3- and -3,4-dicarboxylic acid anhydride and its ring-substituted products; pyrazine-2,3-dicarboxylic acid anhydride and its ring-substituted products; furan-2,3- and -3,4-dicarboxylic acid anhydride and its ring-substituted products; thiophene-2,3-dicarboxylic acid anhydride and its ring-substituted products; thiophene-2,5-dicarboxylic anhydride and its ring-substituted products; the completely or partially hydrogenated derivatives of the foregoing aromatic anhydrides; and di- or polycyclic anhydrides resulting from Diels-Alder reaction of a diene with maleic anhydride (such as addition products of furan, anthracene, 1,3-cyclohexadiene, or cyclopentadiene with maleic anhydride).

More preferred anhydrides are those of maleic, phthalic, tetrahydrophthalic, succinic and 3-oxaglutaric acid.

Beyond the foregoing examples of suitable embodiments of $Ac^1$, structures can also be used which comprise —$(CH_2)_n$—COOH; —$(CH_2)_n$—COO$^-$$M^+$; or phenyl substituted with —COOH, (—COO)$^-$$M^+$, —$(CH_2)_n$—COOH, —O—$(CH_2)_n$—COOH, —$SO_3H$, (—$SO_3$)$^-$$M^+$, —$PO_3H_2$, (—$PO_3$)$^{-2}$$(M^+)_2$, —$PO_4H_2$, —$PO_4$R'H, (—$PO_4$)$^{-2}$$(M^+)_2$, (—$PO_4$R')$^-$$M^+$, or —X—N(R")—CO—Y—COOH; in which n is an integer from 0 to 8; $M^+$ is $Na^+$, $K^+$, $Li^+$, or $NH_4+$; R' and R" are each independently an alkyl, aryl, or arylalkyl group; Y is a divalent saturated or unsaturated, substituted or unsubstituted open chain group comprising a chain of 2 to 4 carbon atoms, a divalent substituted or unsubstituted monocyclic or bicyclic group comprising 5 to 10 atoms other than hydrogen in the monocyclic or bicyclic group, of which a maximum of two atoms are heteroatoms independently selected from the group consisting of oxygen, nitrogen, and sulfur, and the remainder are carbon atoms.; and X is an aliphatic, aromatic, or arylaliphatic spacer group.

Group $Ac^2$ can be introduced into the polymeric resin by reaction, under commonly known and practiced conditions, of the hydroxyl groups on the polymeric resin with an intramolecular anhydride corresponding to any one of structures I, II, or III

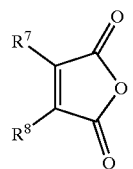

I

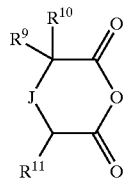

II

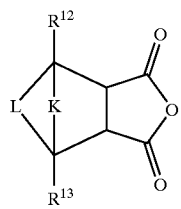

III in which:
  $R^7$ and $R^8$ are each independently a hydrogen atom or an alkyl group, or $R^7$ and $R^8$ form a 6-membered carbocyclic aromatic ring or a 5- or 6-membered heteroaromatic ring which is unsubstituted or substituted with one or more alkyl, aryl, or arylalkyl groups; or $R^7$ and $R^8$ form an unsaturated 5-membered or an unsaturated 6-membered ring or a partially hydrogenated 5-membered, or $R^7$ and $R^8$ form a partially hydrogenated 6-membered ring fused with up to two aromatic or cycloaliphatic rings;
  $R^9$, $R^{10}$ and $R^{11}$ are each independently a hydrogen atom or an alkyl group, in which $R^9$ and $R^{11}$ are either separate or are interconnected to form an unsubstituted or a substituted saturated aliphatic ring or an unsubstituted or a alkyl-, aryl-, or arylalkyl-substituted unsaturated aliphatic ring which, inclusive of J, has either five or six ring members,
  $R^{12}$ and $R^{13}$ are each independently a hydrogen atom or an alkyl group,
  J is a single bond, an unsubstituted or a alkyl-, aryl-, or arylalkyl-substituted 1,1-alkylene group; an unsubstituted or a substituted 1,1-cycloalkylene group; an oxygen atom; or a sulfur atom,
  K is an oxygen atom or a sulfur atom, a 1,1-alkylene group; a 1,2-alkylene group; or a 1,2-alkenylene group, each of which may be fused with an aromatic or cycloaliphatic ring, and
  L is a connecting ring member required to form a saturated ring or an unsaturated ring, in which the ring is unsubstituted or alkyl-, aryl-, or arylalkyl-substituted, and in which the ring may be fused with up to two aromatic or cycloaliphatic rings.

Preferred anhydrides for this purpose are maleic anhydride, phthalic anhydride, tetrahydrophthalic anhydride, succinic anhydride, 3-oxaglutaric anhydride, itaconic anhydride, and the Diels-Alder adduct of a diene with maleic anhydride.

Unit (E) comprises one or both of $E^1$ and $E^2$. Unit (E) comprises about 0.01 to about 2 mol %, preferably about 0.05 to about 1 mol % of the polymeric acetyl resin.

In $E^1$, group $In^1$ can be incorporated into the polymeric resin by acetal formation under the conditions described above. Suitable aldehydes for this purpose include, but are not limited to: 3,5-di-t-butyl-4-hydroxybenzaldehyde; 3,5-d-t-butyl-2-hydroxybenzaldehyde; 3-t-butyl-2-hydroxybenzaldehyde; 5-t-butyl-2-hydroxybenzaldehyde; 4-t-butyl-2,6-diformylphenol; 2-hydroxy-5-methoxybenzaldehyde; 2,4-dihydroxybenzaldehyde; 2,5-dihydroxybenzaldehyde; 2-hydroxy-4-methylbenzaldehyde; 2-hydroxy-4-methoxybenzaldehyde; 3,4-dihydroxybenzaldehyde; 2,3,4-trihydroxybenzaldehyde; 2,4,5-trihydroxybenzaldehyde; and 2,4,6-trihydroxybenzaldehyde. The acetal of any of these with lower alcohols can also be used. Suitable nitroso compounds for introducing group $In^1$ include, but are not limited to, aromatic moieties having a nitroso group and aldehyde functionality or an acetal thereof, e.g. nitrosobenzaldehyde, nitrosalicylaldehyde, and the acetals of these with lower alcohols. Suitable quinones for introducing $In^1$ include, for example, formyl-o- or p-benzoquinone; 2-, or 3-formyl-9,10-anthraquinone; and formyl 1,2- or 1,4-naphthoquinone.

$In^2$ can be incorporated into the polymer via esterification with carboxylic or sulfonic acid compounds bearing appropriate functionality, under conventional conditions. Suitable carboxylic acids include, for example: 3,5-di-t-butyl-4-hydroxybenzoic acid; 3,5-di-t-butyl-2-hydroxybenzoic acid; 3-t-butyl-2-hydroxybenzoic acid; 5-t-butyl-2-hydroxybenzoic acid; 5-t-butyl-3-formyl-2-hydroxybenzoic acid; 2-hydroxy-5-methoxybenzoic acid; 2,4-dihydroxybenzoic acid; 2,5-dihydroxybenzoic acid; 2-hydroxy-4-methylbenzoic acid; 2-hydroxy-4-methoxybenzoic acid; 3,4-dihydroxybenzoic acid; 2,3,4-trihydroxybenzoic acid; 2,4,5-trihydroxybenzoic acid; and 2,4,6-trihydroxybenzoic acid. Suitable sulfonic acids include, for example: 3,5-di-t-butyl-4-hydroxybenzenesulfonic acid; 3,5-di-t-butyl-2-hydroxybenzenesulfonic acid; 3-t-butyl-2-hydroxybenzenesulfonic acid; 5-t-butyl-2-hydroxybenzenesulfonic acid; 5-t-butyl-3-formyl-2-hydroxybenzenesulfonic acid; 2-hydroxy-5-methoxybenzenesulfonic acid; 2,4-dihydroxybenzenesulfonic acid; 2,5-dihydroxybenzenesulfonic acid; 2-hydroxy-4-methylbenzenesulfonic acid; 2-hydroxy-4-methoxybenzenesulfonic acid; 3,4-dihydroxybenzenesulfonic acid; 2,3,4-trihydroxybenzenesulfonic acid; 2,4,5-trihydroxybenzenesulfonic acid; and 2,4,6-trihydroxybenzenesulfonic acid. Suitable nitroso compounds that can be used to introduce $In^2$ include, for example, aromatic compounds having a nitroso group and carboxylic or sulfonic acid functionality, e.g. nitrosobenzoic acid; nitrosalicylic acid, nitrosobenzenesulfonic acid; and nitrosotoluenesulfonic acid. Suitable quinones that can be used to introduce $In^2$ include, for example, 9,10-anthraquinone-2-sulfonic acid; 9,10-anthraquinone-2-carboxylic acid; 1,4-benzoquinone-2-carboxylic acid; and 1,4-benzoquinone-2-sulfonic acid.

$In^2$ can also be incorporated into the polymer via reaction with compounds having the general formula $R^{18}$—W, where W is one of

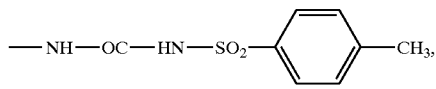

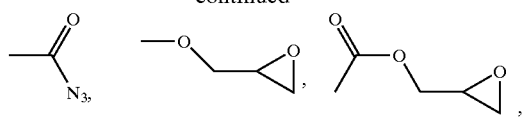

—NCO, and —OCN, and where $R^{18}$ is a group capable of inhibiting free radical polymerization. Examples of $R^{18}$ include, for example, 3,5-di-t-butyl-4-hydroxyphenyl; 3,5-di-t-butyl-2-hydroxyphenyl; 3-t-butyl-2-hydroxyphenyl; 5-t-butyl-2-hydroxyphenyl; 5-t-butyl-3-formyl-2-hydroxyphenyl; 2-hydroxy-5-methoxyphenyl; 2,4-dihydroxyphenyl; 2,5-dihydroxyphenyl; 2-hydroxy-4-methylphenyl; 2-hydroxy-4-methoxyphenyl; 3,4-dihydroxyphenyl; 2,3,4-trihydroxyphenyl; 2,4,5-trihydroxyphenyl; and 2,4,6-trihydroxyphenyl.

$In^2$ can also be incorporated into the polymer via reaction with furanones bearing appropriate functionality. Suitable furanones include compounds of structure IV, in which $R^{15}$ and $R^{16}$ can be alkyl, aryl, or arylalkyl, and $R^{17}$ can be OH, O-alkyl, or

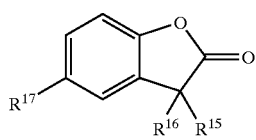

IV

Especially preferred is structure IV in which $R^{15}$ and $R^{16}$ are both phenyl and $R^{17}$ is methoxy.

The polymeric acetal resin may comprise the units in any order and typically comprises about 10 to about 60 mol % of unit (A); about 5 to about 60 mol % of unit (B); about 0.3 to about 30 mol % of unit (C); about 1 to about 40 mol % of unit (D); and about 0.01 to about 2 mol % of unit (E). Preferably, the polymeric acetal resin comprises about 20 to about 50 mol % of unit (A), about 20 to about 50 mol % of unit (B), about 0.5 to about 20 mol % of unit (C), about 2 to about 10 mol % of unit (D), and about 0.05 to about 1 mol % of unit (E). Unit (D) may be unit ($D^1$), unit ($D^2$), or a combination thereof, and unit (E) may be unit ($E^1$), unit ($E^2$), or a combination thereof.

The particular composition used will depend on the intended application. Developability, photosensitivity, printing ink receptivity, shelf-life under elevated humidity and temperature, and other performance factors are dependent on the composition of the polymer, and may be determined using conventional evaluation procedures.

Polymeric Diazo Resin

The photosensitive composition additionally comprises a polymeric diazo resin or a mixture of polymeric diazo resins. A variety of such materials are known in the art. They may be prepared, for example, by condensation of a monomer, such as is described in DE 2024244 with a condensation agent, such as formaldehyde, acetaldehyde, propionaldehyde, butyraldehyde, isobutyraldehyde or benzaldehyde. Furthermore, mixed condensation products are used which, apart from the diazonium salt units, comprise other non-photosensitive units which are derived from condensable compounds, in particular from aromatic amines, phenols, phenol ethers, aromatic thioethers, aromatic hydrocarbons, aromatic heterocycles or organic acid amides.

Especially useful polymeric diazo resins are reaction products of diphenylamine-4-diazonium salts, optionally having a methoxy group in the phenyl group bearing the diazo group, with formaldehyde or 4,4-bis-methoxy-methyl diphenyl ether. Dihydrogen phosphate, hexafluorophosphate, hexafluoroantimonate, hexafluoroarsenate, tetrafluoroborate, and aromatic sulfonates such as 4-tolylsulfonate or mesitylene sulfonate are particularly suitable counterions for these polymeric diazo resins.

Other Ingredients

The composition may comprise other ingredients that are conventional components of photosensitive compositions.

Exposure indicators are well known. They generate color in the imaged regions useful for gauging the degree of exposure and for detecting defects in the image prior to development. Triaryl methane dyes (such as Victoria blue BO, Victoria blue R, Crystal Violet) or azo dyes (such as 4-phenyl-azo-diphenylamine, azobenzene or 4-N,N-dimethylamino-azobenzene) are preferred. When present, the exposure indicator comprises about 0.02 to about 10 wt %, preferably about 0.5 to about 6 wt %, of the photosensitive composition.

Suitable colorants for improving the contrast of the image on the imaged and developed imageable element include dyes that dissolve well in the coating solvent and pigments that are easily introduced in the dispersed form. Suitable contrast dyes include, for example, rhodamine dyes, methyl violet dyes, methyl violet pigments, anthraquinone pigments, phthalocyanine dyes, and phthalocyanine pigments. When present, the colorant comprises about 1 to about 15 wt %, preferably about 2 to about 10 wt %, of the photosensitive composition.

The photosensitive composition may comprise one or more stabilizing acids. These stabilizing acids include, for example, phosphoric, citric, benzoic, m-nitrobenzoic, benzenesulfonic, m-nitrobenzenesulfonic, p-anilino azobenzene sulfonic, p-toluene sulfonic and tartaric acids. In some formulations a mixture of several different acids is advantageous. Phosphoric acid is preferably used as stabilizing acid. When present, the acid typically comprises about 0.2 to about 6 wt % of the photosensitive composition.

The photosensitive composition may comprise one or more plasticizers. Suitable plasticizers include, for example, dibutyl phthalate, triaryl phosphate and dioctyl phthalate. Dioctyl phthalate is especially preferred. When present, the amount of plasticizer used is typically about 0.25 to about 2 wt % of the photosensitive composition.

Composition

The binder typically comprises about 5 to about 95 wt %, preferably about 15 to about 60 wt %, most preferably about 25 to about 50 wt %, of the photosensitive composition. The diazo resin typically comprises about 3 to about 60 wt %, preferably about 10 to about 50 wt % of the photosensitive composition. Other ingredients typically comprise 0 to about 25 wt %, preferably about 2 to about 15 wt % of the photosensitive composition.

Imageable Elements

The imageable element comprises a layer of the photosensitive composition over a substrate.

Substrate

The photosensitive composition may be applied to a wide variety of substrates. The substrate comprises a natural or synthetic support, preferably one that has been surface treated to improve adhesion of the photosensitive composition and/or hydrophilicity of nonimage areas of the developed lithographic plate.

The substrate preferably is a strong, stable and flexible sheet. It should resist dimensional change under conditions of use so that color records will register in a full-color image. Typically, it can be any self-supporting material, including, for example, polymeric films such as polyethylene terephthalate film, ceramics, metals, or stiff papers, or a lamination of any of these materials. Metal substrates include aluminum, zinc, titanium, and alloys thereof, of which aluminum is preferred.

The particular substrate will generally be determined by the intended application. The photosensitive compositions of this invention are especially suited for use in the production of lithographic printing plates.

For lithographic printing, the substrate comprises a support, which may be any material conventionally used to prepare imageable elements useful as lithographic printing plates, with at least one hydrophilic surface. Aluminum foils and polymeric films are common substrate materials. The layer of photosensitive material is over the hydrophilic surface.

The backside of the substrate (i.e., the side opposite the layer of photosensitive material) may be coated with an antistatic agent and/or a slipping layer or matte layer to improve handling and "feel" of the imageable element.

If the substrate is aluminum, the surface may be treated by techniques known in the art, including physical graining, electrochemical graining, chemical graining, and anodizing. The substrate should be of sufficient thickness, typically about 100 to about 600 $\mu$m, to sustain the wear from printing and be thin enough to wrap around a printing form. Typically, the substrate comprises an interlayer between the aluminum support and the top layer. The interlayer may be formed by coating the support with, for example, dextrin, hexafluorosilicic acid, a phosphate/fluoride mixture, polyvinyl phosphonic acid, a polyvinyl phosphonic acid copolymer, or a silicate, by means and with materials well known in the art.

Preparation of the Imageable Elements

The imageable element may be prepared by applying a layer of photosensitive composition over the hydrophilic surface of the substrate using conventional coating or lamination methods. Typically the ingredients are dispersed or dissolved in a suitable coating solvent, and the resulting mixtures coated by conventional methods, such as spin coating, bar coating, gravure coating, roller coating, dip coating, air knife coating, gravure offset coating, hopper coating, blade coating, wire doctor coating, and spray coating. The term "coating solvent" includes mixtures of solvents, especially mixtures of organic solvents.

Selection of the solvents used to coat the photosensitive layer depends on the nature of the polymeric acetal resin, the diazo resin, and the other ingredients, if any, present in the photosensitive composition. A variety of conventional organic solvents can be used to dissolve or disperse the photosensitive composition. However, for convenience during the drying process, solvents having a boiling point of between 40° C. and 200° C., preferably between 60° C. and 160° C., are typically used. The solids content of the coating solution is typically about 2 to about 50 wt %, based on the weight of the solvent.

Suitable organic solvents include, for example, alcohols such as methyl alcohol, ethyl alcohol, n- and iso-propyl alcohols, n- and iso-butyl alcohols and diacetone alcohol; ketones such as acetone, methyl ethyl ketone, methyl propyl ketone, methyl butyl ketone, methyl amyl ketone, methyl hexyl ketone, diethyl ketone, diisobutyl ketone, cyclohexanone, methyl cyclohexanone, and acetyl acetone; polyhydric alcohols and derivatives thereof such as ethylene glycol, methyl CELLOSOLVE®, methyl CELLOSOLVE® acetate, ethyl CELLOSOLVE®, diethyl CELLOSOLVE®, CELLOSOLVE® acetate, butyl CELLOSOLVE®, butyl CELLOSOLVE® acetate, propylene glycol monomethyl ether, propylene glycol monomethyl ether acetate, propylene glycol monoethyl ether, propylene glycol monoethyl ether acetate, propylene glycol monobutyl ether, and 3-methyl-3-methoxybutanol; and special solvents such as dimethylsulfoxide, N,N-dimethylformamide, methyl lactate, and ethyl lactate. These solvents may be used singularly, or in mixtures of two or more solvents. The amount of photosensitive composition solution or dispersion applied during the coating process is preferably within a range from 10 mL/m$^2$ to 100 mL/m$^2$.

Drying of the imageable element is usually carried out using heated air. The air temperature is preferably between 30° C. and 200° C., more preferably between 40° C. and 140° C. The air temperature may be held constant during the drying process, or may be gradually stepped up. In some cases it may be beneficial to use a stream of air for moisture absorption. The heated air may preferably be blown over the layer at a rate of 0.1 m/s to 30 m/s, with values from 0.5 m/s to 20 m/s being particularly desirable. Following drying, the coating weight of the photosensitive layer is typically about 0.5 to about 4 g/m$^2$, preferably about 0.8 to about 3 g/m$^2$.

Imaging and Processing of the Imageable Element

Imaging of the imageable element may be carried out by well-known methods. Photoimageable elements are imaged by exposure to actinic radiation that is absorbed by the photoreactive components of the element. Any convenient source or sources of actinic radiation providing wavelengths in the region of the spectrum that overlap the absorption bands of the photoimageable layer can be used for imaging. By "actinic radiation" is meant any radiation that can induce photoimaging.

Exposure is typically with ultraviolet radiation. Conventional light sources include carbon arc lamps, mercury lamps, xenon lamps, tungsten lamps, metal halide lamps, and fluorescent lamps. Coherent light sources are lasers, such as xenon, argon ion, and ionized neon lasers, as well as tunable dye lasers and the frequency doubled neodymium: YAG laser. Imagewise exposure is typically carried out through a photomask, but direct digital exposure with a laser emitting at the appropriate wavelength is also possible.

Imaging produces an imaged element, which comprises a latent image of imaged (unexposed) regions and non-imaged (exposed) regions. The exposed regions are "hardened" so they are not removed by the developer. Development of the imaged element to form a lithographic printing plate, or printing form, converts the latent image to an image by removing the unexposed regions, revealing the hydrophilic surface of the underlying substrate.

Suitable developers are known the art. For example, a typical amine-based alkali developing solution including an organic solvent may be used. Furthermore, in those cases where an alkali soluble resin is used as a binder resin, an aqueous alkali developing solution, which does not comprise any substantial amounts of organic solvents, may also be used. If required, the developed lithographic printing plate may be subjected to water washing and oil desensitization, subjected to oil desensitization without water washing, treated with an acidic aqueous solution, or treated with an acidic aqueous solution and subjected to oil desensitization.

The exposed and developed plates are typically treated with a protective hydrophilic coating ("gum"), generally by applying an aqueous solution of hydrophilic polymers, wetting agents and other additives. For certain uses it is also advantageous to increase the mechanical strength of the printing layer of the developed plate by means of a heat treatment or a combined use of heat and ultraviolet radiation. For this purpose, the plate is first treated with a solution that protects the non-image areas such that the heat treatment will cause no ink receptivity in these areas. A suitable solution is described e.g. in U.S. Pat. No. 4,355,096.

INDUSTRIAL APPLICABILITY

The photosensitive compositions are especially useful for producing lithographic printing plates. The photosensitive compositions and the lithographic printing plate precursors made therefrom have good shelf life, allowing for extended storage prior to use.

They may be used in recording materials for creating images on suitable carriers and receiving sheets, for photoresists, and for color proofing. In particular the compositions may also be used as a photoresist for the modification of substrate surfaces by etching, plating, dyeing, etc. Thus the photosensitive composition may be applied to a substrate surface, imagewise exposed to actinic radiation, developed to remove unexposed portions of the composition from the substrate surface, and the uncovered surface then modified by etching, plating or a combination thereof. Typically the imaged composition is then stripped from the modified substrate.

The advantageous properties of the invention can be observed by reference to the following examples, which illustrate but do not limit the invention.

EXAMPLES

| | |
|---|---|
| MOWIOL ® 1098 | Poly(vinyl alcohol), 2% acetate (Clariant, Wiesbaden, Germany) |
| Nega 107 | Negative diazo resin derived from condensation of 3-methoxy-diphenylamine-4-diazonium sulfate and 4,4'-bis-methoxymethyldiphenylether, isolated as mesitylene sulfonate salt (Panchim, Lisses, France) |
| NEKAL ® BX Paste | Sodium alkyl naphthalene sulfonate (BASF, Ludwigshafen, Germany) |
| RENOL ® Blue B2g-HW | Copper phthalocyanine pigment dispersed in polyvinyl butyral (Clariant, Wiesbaden, Germany) |
| REWOPOL ® NLS 28 | 30 wt % solution of sodium lauryl sulfate in water (REWO Chemicals, Widnes, Cheshire, UK) |
| TEXAPON ® 842 | 42 wt % solution of sodium octyl sulfate in water (Henkel, Düsseldorf, Germany) |

Pretreatment of Substrates

For each plate precursor, the aluminum substrate was pre-treated with polyvinylphosphonic acid before coating with the photosensitive composition. The treatment consisted of applying to an electrochemically roughened and anodized aluminum foil an aqueous solution of polyvinylphosphonic acid, followed by drying for 5 minutes at a temperature between about 80° C. and 120° C. This gave a polyvinylphosphonic acid coating weight of about 0.005 to 0.03 g/m$^2$.

Examples 1 to 4

MOWIOL® 1098 (68.75 g) was dissolved in 650 mL of dimethyl sulfoxide at 60° C. A mixture of X g acetaldehyde, Y g butyraldehyde, Z g 4-carboxybenzaldehyde and W g of 3,5-di-t-butyl-4-hydroxybenzaldehyde, was added and the mixture stirred at 60° C. for 2 hours. The mixture was cooled to room temperature and the polymer precipitated by pouring the mixture into cold water. The polymer was isolated by filtration and dried at 40° C. for 24 hours in an oven. Table 1 shows the amount of W, X, Y, Z used.

TABLE 1

| | Binders | | | | |
|---|---|---|---|---|---|
| | X (grams) | Y (grams) | Z (grams) | W (grams) | found acid number (mg KOH/1 g) |
| Example 1 (Comparative) | 6.62 | 25.34 | 10.85 | 0 | 38.9 |
| Example 2 | 6.62 | 25.34 | 10.85 | 0.88 | 39.5 |
| Example 3 | 6.62 | 24.82 | 10.85 | 0.88 | 40.1 |
| Example 4 | 6.62 | 25.34 | 9.76 | 1.76 | 35.0 |

Examples 5–9

Coating solutions were prepared from these binders as shown in Table 2. The components were dissolved with stirring in 200 mL of a mixture consisting of 30 parts by volume ethylene glycol monomethyl ether 45 parts by volume methanol 25 parts by volume methyl ethyl ketone.

TABLE 2

Coating Example

| | Example 5 (comparative) | Example 6 | Example 7 | Example 8 | Example 9 (comparative) |
|---|---|---|---|---|---|
| Binder of Example 1 | 4.38 g | | | | 4.38 g |
| Binder of Example 2 | | 4.38 g | | | |
| Binder of Example 3 | | | 4.38 g | | |
| Binder of Example 4 | | | | 4.38 g | |
| 2,6-di-t-butyl-4-methyl phenol | | | | | 0.20 g |
| Nega 107 | 4 g | 4 g | 4 g | 4 g | 4 g |
| RENOL ® blue B2G-HW | 1.5 g | 1.5 g | 1.5 g | 1.5 g | 1.5 g |
| 4-(Phenylazo)diphenyl-amine | 0.05 g | 0.05 g | 0.05 g | 0.05 g | 0.05 g |
| Phosphoric acid | 0.07 g | 0.07 g | 0.07 g | 0.07 g | 0.07 g |

In each case the resulting solution was filtered, after which it was applied to a substrate which had been pretreated as described above, and dried for 4 min at 90° C. The resulting coating weight was about 1 g/m The resulting plate precursors were each exposed under a silver film halftone step wedge having a tonal range of 0.15 to 1.95, and density increments of 0.15, to give a negative model using a metal halide lamp (MH burner, available from W. Sack) of 300 mJ/cm².

The exposed plate precursors were then developed with a developer consisting of: 3.4 parts by weight REWOPOL® NLS 28, 1.8 parts by weight 2-phenoxy ethanol, 1.1 parts by weight diethanol amine, 1.0 parts by weight TEXAPON® 842, 0.6 parts by weight NEKAL® Paste, 0.2 parts by weight 4-toluenesulfonic acid, and 91.9 parts by weight water.

Development entailed soaking the photoexposed plate precursors for 30 seconds in the developer, followed by rubbing over the surface for another 30 seconds using a tampon and then rinsing the entire plate with water. After this treatment the exposed portions remained on the plate while the unexposed portions were removed.

For the assessment of photosensitivity, lithographic plate precursors were prepared, exposed and developed as above, wiped and rubbed with an aqueous solution of 0.5% phosphoric acid and 6% gum arabic, blackened with a printing ink, and loaded onto a sheet-fed offset printing machine and under normal printing conditions. All plates of Examples 5–9 provided 200,000 print copies of good quality. There was no significant effect of the different compositions of the Example 1 to 5 concerning the ink receptivity of the plates or the photospeed of the plate precursors.

To assess the storage stability of the coating solutions, and that of the plate precursors made from them, precursors were made from both a freshly made and a 48-hour old coating formulation, and each of these two types of plate precursor was developed without prior photoexposure under each of two conditions: right after coating, and after a 60 min storage at 90° C. For each type, the critical developing time $T_c$ (defined as the time in seconds to get a totally clean substrate surface) was determined as follows:

An unexposed, 7 cm×38 cm piece of the plate precursor was rubbed with a cotton pad wetted with 40 ml of the above-mentioned developer at such a speed that every rub over the piece of plate precursor required 1 second, until all of the coating was removed. The resulting values of $T_c$ are summarized in Table 3.

TABLE 3

Critical Developing Time (sec)

| | No Thermal Treatment | | Thermal Treatment at 90° C. for 60 Minutes Before Development | |
|---|---|---|---|---|
| Example No. | fresh coating batch | 48 hours old coating batch | fresh coating batch | 48 hours old coating batch |
| Example 5 (Comparative) | 7 | 15 | 10 | 22 |
| Example 6 | 8 | 11 | 10 | 15 |
| Example 7 | 7 | 8 | 9 | 9 |
| Example 8 | 7 | 8 | 9 | 9 |
| Example 9 (Comparative) | 7 | 14 | 8 | 22 |

The addition of a low molecular weight radical inhibitor in Example 9 did not afford retention of fast developing times upon aging, the results being essentially the same as in Example 5 where no inhibitor was used. Surprisingly, however, the plate precursors of Examples 6, 7, and 8, in which an amount of inhibitor similar to that of Example 9 was however bound to the binder, showed relatively little deterioration of developing times when the coating solutions became older and when the plate precursors were aged by thermal treatment.

Having described the invention, we now claim the following and their equivalents.

What is claimed is:

1. A photosensitive composition comprising:

a polymeric diazo resin, and a polymeric acetal resin comprising the units (A), (B), (C), (D), and (E), in which:

unit (A) has the structure:

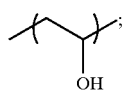

unit (B) has the structure:

[structure: cyclic acetal with R substituent]

unit (C) has the structure:

[structure: with O-C(=O)-R² ester group]

unit (D) is selected from the group consisting of (D¹), (D²), and combinations thereof,
in which unit (D¹) has the structure:

[structure: cyclic acetal with Ac¹]

and unit (D²) has the structure

[structure: with R¹ and Ac²]; and unit (E) is selected from the group consisting of (E¹), (E²), and combinations thereof in which
unit (E¹) has the structure:

[structure: cyclic acetal with In¹]

and unit (E²) has the structure

[structure: with In²];

in which the polymeric acetal resin comprises about 10 to about 60 mol % of unit (A), about 5 to about 60 mol % of unit (B), about 0.3 to about 30 mol % of unit (C), about 1 to about 40 mol % of unit (D), and about 0.01 to about 2 mol % of unit (E);
in which:
R and $R^2$ are each independently hydrogen, an aliphatic group, an aromatic group, or an arylallphatic group;
$Ac^1$ and $Ac^2$ are each independently a group comprising a carboxylic acid group, a sulfonic acid group, a sulfonamido group, a phosphonic acid group, a proton-bearing phosphoric ester group, a phenolic group, or an alkali metal salt or an ammonium salt thereof;
$R^1$ is H, $C_1$–$C_{10}$ alkyl, or carboxyl-substituted $C_1$–$C_{10}$ alkyl; and
$In^1$ and $In^2$ are each independently a group that inhibits free radical polymerization.

2. The composition of claim 1 in which $R^2$ is methyl and R is methyl, ethyl, or propyl.

3. The composition of claim 1 in which unit D is $D^1$, and $Ac^1$ is —$(CH_2)_n$—COOH; (—$(CH_2)_n$—COO)⁻M⁺; or phenyl substituted with —COOH, (—COO)⁻M⁺, —$(CH_2)_n$—COOH, —O—$(CH_2)_n$—COOH, —$SO_3H$, (—$SO_3$)⁻M⁺, —$PO_3H_2$, (—$PO_3$)⁻²$(M^+)_2$, —$PO_4H_2$, —$PO_4R'H$, (—$PO_4$)⁻²$(M^+)_2$, (—$PO_4R'$)⁻M⁺, or —X—N(R")—CO—Y—COOH;

n is an integer from 0 to 8;

$M^+$ is $Na^+$, $K^+$, $Ll^+$, or $NH_4^+$;

R' and R" are each independently alkyl, aryl, or arylalkyl;

X is a divalent alkyl, aryl, or arylalkyl group comprising from 1 to 20 carbon atoms; and Y is a divalent saturated or unsaturated, substituted or unsubstituted open chain group comprising a chain of 2 to 4 carbon atoms, a divalent substituted or unsubstituted monocyclic or bicyclic group comprising 5 to 10 atoms other than hydrogen in the monocyclic or bicyclic group, of which a maximum of two atoms are heteroatoms independently selected from the group consisting of oxygen, nitrogen, and sulfur, and the remainder are carbon atoms.

4. The composition of claim 3 in which Y is —$CR^3R^4$—$CR^5R^6$—, —$CR^3$=$CR^4$—,

[structures: furan, thiophene, pyrazine, pyridine, benzene, naphthalene (two isomers), pyridine, norbornene derivatives]

in which $R^3$, $R^4$, $R^5$, and $R^6$ are each independently selected from the group consisting of hydrogen and alkyl groups comprising 1 to 3 carbon atoms.

5. The composition of claim 3 in which R" is hydrogen or alkyl, and the spacer group X is a —$CH_2$—, —$CH(CH_3)$— or —$CH_2$—$CH_2$—$CH_2$— group.

6. The composition of claim 1 in which unit D is $D^2$, and $Ac^2$ is —COOH and $R^1$ is H, —$CH_3$, or —$CH_2COOH$.

7. The composition of claim 1 in which unit D is $D^2$, and $R^1$ is H, and $Ac^2$ comprises a cyclic polycarboxylic acid anhydride ring opened with a polymeric acetal resin hydroxyl group.

8. The composition of claim 7 in which the anhydride has structure I, II, or III:

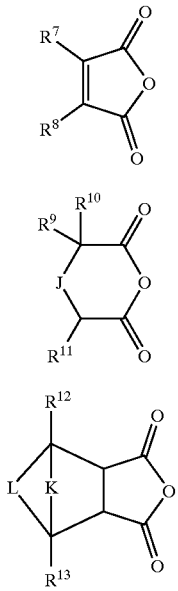

in which:
R$^7$ and R$^8$ are each independently a hydrogen atom or an alkyl group, or R$^7$ and R$^8$ form a 6-membered carbocyclic aromatic ring or a 5- or 6-membered heteroaromatic ring which is unsubstituted or substituted with one or more alkyl, aryl, or arylalkyl groups; or R$^7$ and R$^8$ form an unsaturated 5-membered or an unsaturated 6-membered ring or a partially hydrogenated 5-membered, or R$^7$ and R$^8$ form a partially hydrogenated 6-membered ring fused with up to two aromatic or cycloaliphatic rings;
R$^9$, R$^{10}$ and R$^{11}$ are each independently a hydrogen atom or an alkyl group, in which R$^9$ and R$^{11}$ are either separate or are interconnected to form an unsubstituted or a substituted saturated aliphatic ring or an unsubstituted or a alkyl-, aryl-, or arylalkyl-substituted unsaturated aliphatic ring which, inclusive of J, has either five or six ring members,
R$^{12}$ and R$^{13}$ are each independently a hydrogen atom or an alkyl group,
J is a single bond, an unsubstituted or a alkyl-, aryl-, or arylalkyl-substituted 1,1-alkylene group; an unsubstituted or a substituted 1,1-cycloalkylene group; an oxygen atom; or a sulfur atom,
K is an oxygen atom or a sulfur atom, a 1,1-alkylene group; a 1,2-alkylene group; or a 1,2-alkenylene group, each of which may be fused with an aromatic or cycloaliphatic ring, and
L is a connecting ring member required to form a saturated ring or an unsaturated ring, in which the ring is unsubstituted or alkyl-, aryl-, or arylalkyl-substituted, and in which the ring may be fused with up to two aromatic or cycloaliphatic rings.

9. The composition of claim 8 in which the anhydride is maleic anhydride, phthalic anhydride, tetrahydrophthalic anhydride, succinic anhydride, 3-oxaglutaric anhydride, itaconic anhydride, or the Diels-Alder adduct of a diene with maleic anhydride.

10. The composition of claim 1 in which In$^1$ and In$^2$ each independently comprise a functional group selected from the group consisting of quinone and nitroso.

11. The composition of claim 1 in which In$^1$ and In$^2$ each independently comprise at least one aromatic moiety to which is attached at least one phenolic hydroxyl group.

12. The composition of claim 11 in which unit E is E$^1$, and In$^1$ is 3,5-di-t-butyl-4-hydroxyphenyl; 3,5-di-t-butyl-2-hydroxyphenyl; 3-t-butyl-2-hydroxyphenyl; 5-t-butyl-2-hydroxyphenyl; 5-t-butyl-3-formyl-2-hydroxyphenyl; 2-hydroxy-5-methoxyphenyl; 2,4-dihydroxyphenyl; 2,5-dihydroxyphenyl; 2-hydroxy-4-methylphenyl; 2-hydroxy-4-methoxyphenyl; 3,4-dihydroxyphenyl; 2,3,4-trihydroxyphenyl; 2,4,5-trihydroxyphenyl; or 2,4,6-trihydroxyphenyl.

13. The composition of claim 11 in which unit E is E$^2$, and In$^2$ comprises a carbonyloxy group or a sulfonyloxy group.

14. The composition claim 13 in which the carbonyloxy group is 3,5-di-t-butyl-4-hydroxybenzoyloxy; 3,5-di-t-butyl-2-hydroxybenzoyloxy; 3-t-butyl-2-hydroxybenzoyloxy; 5-t-butyl-2-hydroxybenzoyloxy; 5-t-butyl-3-formyl-2-hydroxybenzoyloxy 2-hydroxy-5-methoxybenzoyloxy; 2,4-dihydroxybenzoyloxy; 2,5-dihydroxybenzoyloxy; 2-hydroxy-4-methyl benzoyloxy; 2-hydroxy-4-methoxybenzoyloxy; 3,4-dihydroxybenzoyloxy; 2,3,4-trihydroxybenzoyloxy; 2,4,5-trihydroxybenzoyloxy; or 2,4,6-trihydroxybenzoyloxy.

15. The composition of claim 13 in which the sulfonyloxy group is 3,5-di-t-butyl-4-hydroxybenzenesulfonyloxy; 3,5-di-t-butyl-2-hydroxybenzenesulfonyloxy; 3-t-butyl-2-hydroxybenzenesulfonyloxy; 5-t-butyl-2-hydroxybenzenesulfonyloxy; 5-t-butyl-3-formyl-2-hydroxybenzenesulfonyloxy; 2-hydroxy-5-methoxybenzenesulfonyloxy; 2,4-dihydroxybenzenesulfonyloxy; 2,5-dihydroxybenzenesulfonyloxy; 2-hydroxy-4-methylbenzenesulfonyloxy; 2-hydroxy-4-methoxybenzenesulfonyloxy; 3,4-dihydroxybenzenesulfonyloxy; 2,3,4-trihydroxybenzenesulfonyloxy; 2,4,5-trihydroxybenzenesulfonyloxy; or 2,4,6-trihydroxybenzenesulfonyloxy.

16. The composition of claim 11 in which unit E is E$^2$, and In$^2$ is R$^{18}$—NH—CO—O—, R$^{18}$—O—CH$_2$—CH(OH)—CH$_2$—O—, R$^{18}$—CO—O—CH$_2$—CH(OH)—CH$_2$—O—, or R$^{18}$—O—CO—NH— and R$^{18}$ is 3,5-di-t-butyl-4-hydroxyphenyl; 3,5-di-t-butyl-2-hydroxyphenyl; 3-t-butyl-2-hydroxyphenyl; 5-t-butyl-2-hydroxyphenyl; 5-t-butyl-3-formyl -2-hydroxyphenyl; 2-hydroxy-5-methoxyphenyl; 2,4-dihydroxyphenyl; 2,5-dihydroxyphenyl; 2-hydroxy-4-methylphenyl; 2-hydroxy-4-methoxyphenyl; 3,4-dihydroxyphenyl; 2,3,4-trihydroxyphenyl; 2,4,5-trihydroxyphenyl; or 2,4,6-trihydroxyphenyl.

17. The composition of claim 11 in which unit E is E$^2$, and In$^2$ is

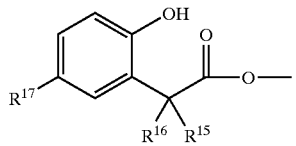

in which R$^{15}$ and R$^{16}$ are each independently alkyl, aryl, or arylalkyl; and R$^{17}$ is OH, O-alkyl, or O-aryl.

18. The composition of claim 1 in which the polymeric acetal resin comprises about 20 to about 50 mol % of unit (A), about 20 to about 50 mol % of unit (B), about 0.5 to about 20 mol % of unit (C), about 2 to about 10 mol % of unit (D), and about 0.05 to about 1 mol % of unit (E).

19. The composition of claim 1 in which:
R is selected from the group consisting of methyl, ethyl, n-propyl, and combinations thereof;
$R_2$ is methyl;
unit D is $D^1$,
$Ac^1$ is p-carboxy phenyl;
unit E is $E^1$, and
$In^1$ is selected from the group consisting of 3,5-di-t-butyl-4-hydroxyphenyl; 3,5-di-t-butyl-2-hydroxyphenyl; 3-t-butyl-2-hydroxyphenyl: 5-t-butyl-2-hydroxyphenyl: 5-t-butyl-3-formyl-2-hydroxyphenyl: 2-hydroxy-5-methoxyphenyl.

20. The composition of claim 19 in which the polymeric acetal resin comprises about 20 to about 50 mol % of unit (A), about 20 to about 50 mol % of unit (B), about 0.5 to about 20 mol % of unit (C), about 2 to about 10 mol % of unit (D), and about 0.05 to about 1 mol % of unit (E).

21. The composition of claim 20 in which $In^1$ is 3,5-di-t-butyl-4-hydroxyphenyl.

22. The composition of claim 1 in which the diazo resin comprises a condensation product of a monomeric diazonium salt of a counterion with a second component.

23. The composition of claim 22 in which the second component is an aldehyde.

24. The composition of claim 23 in which the aldehyde is formaldehyde.

25. The composition of claim 22 in which the second component is an aromatic compound having at least two sites capable of condensing with the monomeric diazonium salt.

26. The composition of claim 25 in which the aromatic compound is a diaryl ether comprising an alkoxymethyl substituent on each of the two aryl moieties.

27. The composition of claim 26 in which the aromatic compound is 4,4'-bis(methoxymethyl) diphenyl ether.

28. The composition of claim 22 in which the monomeric diazonium salt is a diphenylamine-4-diazonium salt.

29. The composition of claim 28 in which the diphenylamine-4-diazonium salt comprises a methoxy substituent on the ring bearing the diazonium group.

30. The composition of claim 22 in which the counterion in the monomeric diazonium salt is dihydrogen phosphate, hexafluorophosphate, or an aromatic sulfonate.

31. The composition of claim 30 in which the aromatic sulfonate is 4-tolylsulfonate or mesitylene sulfonate.

32. An imageable element comprising:
(I) a substrate having a hydrophilic surface; and,
(II) a photosensitive layer over the hydrophilic surface;
in which the photosensitive layer comprises a photosensitive composition comprising a polymeric diazo resin and a polymeric acetal resin comprising the units (A), (B), (C), (D), and (E),
in which:
unit (A) has the structure:

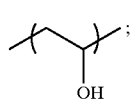

unit (B) has the structure:

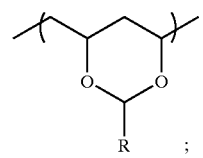

unit (C) has the structure:

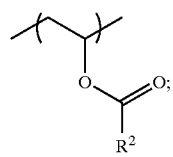

unit (D) is selected from the group consisting of ($D^1$), ($D^2$), and combinations thereof,
in which unit ($D^1$) has the structure:

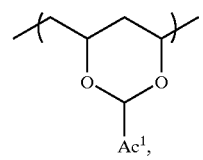

and unit ($D^2$) has the structure

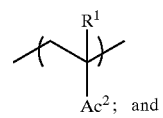

unit (E) is selected from the group consisting of ($E^1$), ($E^2$), and combinations thereof in which
unit ($E^1$) has the structure:

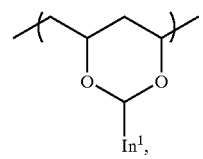

and unit ($E^2$) has the structure

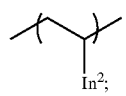

in which the polymeric acetal resin comprises about 10 to about 60 mol % of unit (A), about 5 to about 60 mol % of unit (B), about 0.3 to about 30 mol % of unit (C), about 1 to about 40 mol % of unit CD), and about 0.01 to about 2 mol % of unit (E);
in which:
R and $R^2$ are each independently hydrogen, an aliphatic group, an aromatic group, or an arylaliphatic group;
$Ac^1$ and $Ac^2$ are each independently a group comprising a carboxylic acid group, a sulfonic acid group, a sulfonamido group, a phosphonic acid group, a proton-bearing phosphoric ester group, a phenolic group, or an alkali metal salt or an ammonium salt thereof;

$R^1$ is H, $C_1$–C10 alkyl, or carboxyl-substituted $C_1$–$C_{10}$ alkyl; and $In^1$ and $In^2$ are each independently a group that inhibits free radical polymerization.

33. A method for preparing a lithographic printing plate comprising:
(1) providing an imageable element comprising:
(I) a lithographic substrate having a hydrophilic surface; and,
(II) a photosensitive layer superposed over the hydrophilic surface, in which the photosensitive layer comprises a photosensitive composition comprising a polymeric diazo resin and a polymeric acetal resin comprising the units (A), (B), (C), (D), and (E),
in which:
unit (A) has the structure:

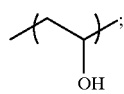

unit (B) has the structure:

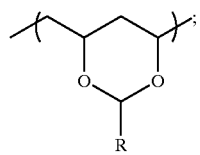

unit (C) has the structure:

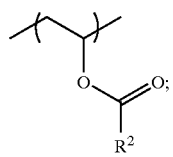

unit (D) is selected from the group consisting of ($D^1$), ($D^2$), and combinations thereof,
in which unit ($D^1$) has the structure:

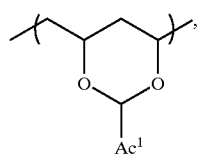

and unit ($D^2$) has the structure

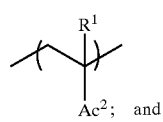

unit (E) is selected from the group consisting of ($E^1$), ($E^2$), and combinations thereof in which unit ($E^1$) has the structure:

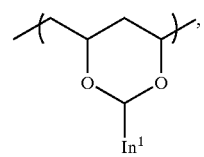

and unit ($E^2$) has the structure

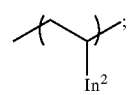

in which the polymeric acetal resin comprises about 10 to about 60 mol % of unit (A), about 5 to about 60 mol % of unit (B), about 0.3 to about 30 mol % of unit (C), about 1 to about 40 mol % of unit (D), and about 0.01 to about 2 mol % of unit (E);

in which:
R and $R^2$ are each independently hydrogen, an aliphatic group, an aromatic group, or an arylaliphatic group;
$Ac^1$ and $Ac^2$ are each independently a group comprising a carboxylic acid group, a sulfonic acid group, a sulfonamido group, a phosphonic acid group, a proton-bearing phosphoric ester group, a phenolic group, or an alkali metal salt or an ammonium salt thereof;
$R^1$ is H, $C_1$–C10 alkyl, or carboxyl-substituted $C_1$–$C_{10}$ alkyl; and
$In^1$ and $In^2$ are each independently a group that inhibits free radical polymerization;
in which the photosensitive layer is soluble or dispersible in an aqueous developer;

(2) Imagewise exposing the photosensitive layer to actinic radiation to produce a photoimaged layer having exposed image areas which are insoluble in the aqueous developer; and (3) applying the aqueous developer to the surface of the photoimaged layer to remove unexposed portions of the photoimaged layer and uncover underlying portions of the hydrophilic surface.

34. A polymeric acetal resin comprising the units (A), (B), (C), (D) and (E), in which
unit (A) has the structure:

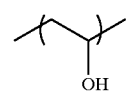

unit (B) has the structure:

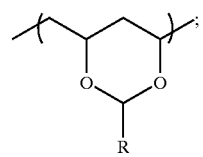

unit (C) has the structure:

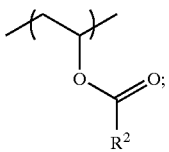

unit (D) is selected from the group consisting of (D¹), (D²), and combinations thereof,
in which unit (D¹) has the structure:

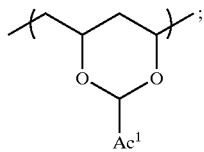

and unit (D²) has the structure

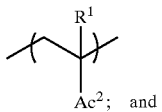

unit (E) is selected from the group consisting of (E¹), (E²), and combinations thereof in which
unit (E¹) has the structure:

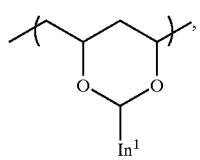

and unit (E²) has the structure

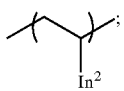

in which the polymeric acetal resin comprises about 10 to about 60 mol % of unit (A), about 5 to about 60 mol % of unit (B), about 0.3 to about 30 mol % of unit (C), about 1 to about 40 mol % of unit CD), and about 0.01 to about 2 mol % of unit (E);

in which:
R and $R^2$ are each independently hydrogen, an aliphatic group, an aromatic group, or an arylaliphatic group;
$Ac^1$ and $Ac^2$ are each independently a group comprising a carboxylic acid group, a sulfonic acid group, a sulfonamido group, a phosphonic acid group, a proton-bearing phosphoric ester group, a phenolic group, or an alkali metal salt or an ammonium salt thereof;
$R^1$ is H, $C_1$–$C_{10}$ alkyl, or carboxyl-substituted $C_1$–$C_{10}$ alkyl; and $In^1$ and $In^2$ are each independently a group that inhibits free radical polymerization.

35. The composition of claim 1 in which:
R is methyl;
$R^1$ is hydrogen;
$R^2$ is hydrogen or a branched or straight-chain alkyl group having 1 to 6 carbon atoms;
$Ac^1$ and $Ac^2$ are each independently a group comprising a carboxylic acid group, a sulfonic acid group, a sulfonamido group, a phosphonic acid group, a proton-bearing phosphoric ester group, or an alkali metal salt or an ammonium salt thereof; and
$In^1$ and $In^2$ each independently comprise at least one aromatic moiety to which is attached at least one phenolic hydroxyl group.

36. The composition of claim 35 in which E is $E^1$, and $In^1$ is 3,5-di-t-butyl-4-hydroxyphenyl; 3,5-di-t-butyl-2-hydroxyphenyl; 3-t-butyl-2-hydroxyphenyl; 5-t-butyl-2-hydroxyphenyl; 5-t-butyl-3-formyl-2-hydroxyphenyl; or 2-hydroxy-5-methoxyphenyl.

37. The composition of claim 35 in which unit E is $E^1$, and $In^2$ comprises:
a carbonyloxy group selected from the group consisting of 3,5-di-t-butyl-4-hydroxybenzoyloxy; 3,5-di-t-butyl-2-hydroxybenzoyloxy; 3-t-butyl-2-hydroxybenzoyloxy; 5-t-butyl-2-hydroxybenzoyloxy; 5-t-butyl-3-formyl-2-hydroxybenzoyloxy; and 2-hydroxy-5-methoxybenzoyloxy; or
a sulfonyloxy group selected from the group consisting of 3,5-di-t-butyl-4-hydroxybenzenesulfonyloxy; 3,5-di-t-butyl-2-hydroxybenzenesulfonyloxy; 3-t-butyl-2-hydroxybenzenesulfonyloxy; 5-t-butyl-2-hydroxybenzenesulfonyloxy; 5-t-butyl-3-formyl-2-hydroxybenzenesulfonyloxy; and 2-hydroxy-5-methoxybenzenesulfonyloxy.

38. The composition of claim 35 in which $Ac^1$ and $Ac^2$ are each independently a group comprising a carboxylic acid group, a sulfonic acid group, or an alkali metal salt or an ammonium salt thereof.

39. The composition of claim 35 in which
unit D is $D^1$, and $Ac^2$ is p-carboxy phenyl; and
unit E is $E^1$, and $In^1$ is 3,5-di-t-butyl-4-hydroxyphenyl.

40. The composition of claim 39 in which the polymeric acetal resin comprises about 20 to about 50 mol % of unit (A), about 20 to about 50 mol % of unit (B), about 0.5 to about 20 mol % of unit (C), about 2 to about 10 mol % of unit (D), and about 0.05 to about 1 mol % of unit (E).

41. The imageable element of claim 32 in which:
R is methyl;
$R^2$ is hydrogen or a branched or straight-chain alkyl group having 1 to 6 carbon atoms;
D is $D^1$, and $Ac^1$ is p-carboxy phenyl; and
E is $E^1$, and $In^1$ is 3,5-di-t-butyl-4-hydroxyphenyl .3,5-di-t-butyl-2-hydroxyphenyl 3-t-butyl-2-hydroxyphenyl; 5-t-butyl-2-hydroxyphenyl 5-t-butyl-3-formyl-2-hydroxyphenyl or 2-hydroxy-5-methoxyphenyl.

* * * * *